(12) United States Patent
Ise

(10) Patent No.: US 8,823,681 B2
(45) Date of Patent: Sep. 2, 2014

(54) METHOD OF OUTPUTTING INPUT POSITION OF TOUCH PANEL

(75) Inventor: Yuichi Ise, Chiba (JP)

(73) Assignee: SMK Corporation, Tokyo (JP)

( * ) Notice: Subject to any disclaimer, the term of this patent is extended or adjusted under 35 U.S.C. 154(b) by 506 days.

(21) Appl. No.: 13/075,080

(22) Filed: Mar. 29, 2011

(65) Prior Publication Data

US 2011/0242030 A1 Oct. 6, 2011

(30) Foreign Application Priority Data

Mar. 30, 2010 (JP) .................................. 2010-78173

(51) Int. Cl.
G06F 3/042 (2006.01)
G06F 3/033 (2013.01)
G06F 3/041 (2006.01)

(52) U.S. Cl.
CPC ............ G06F 3/0416 (2013.01); G06F 3/0421 (2013.01)
USPC ......... 345/175; 345/158; 345/179; 178/18.09

(58) Field of Classification Search
CPC ..... G06F 3/0421; G06F 3/0428; G06F 3/041; G06F 3/0485

USPC ........ 345/157–159, 173, 175, 179; 178/18.09
See application file for complete search history.

(56) References Cited

U.S. PATENT DOCUMENTS 6,333,735 B1 * 12/2001 Anvekar ....................... 345/175
6,831,631 B2 * 12/2004 Chuang ......................... 345/173
2009/0044989 A1 2/2009 Sato

FOREIGN PATENT DOCUMENTS

| JP | 2002-268809 | A | 9/2002 |
| JP | 3986994 | B2 | 10/2007 |
| JP | 2008-262509 | A | 10/2008 |
| JP | 2009-48238 | A | 3/2009 |
| JP | 2009-301250 | A | 12/2009 |

* cited by examiner

*Primary Examiner* — Lun-Yi Lao
*Assistant Examiner* — Jarurat Suteerawongsa

(57) ABSTRACT

A method of outputting an input position of a touch panel is provided which can output an input position intended by an operator even if two or more different input positions are detected. When an input operation on a position different from a first input position is detected in a scan cycle after output of the first input position, the input position where the new input operation is detected is output as a second input position. Even if input operations on two or more different positions are simultaneously detected, only one input position is output.

11 Claims, 10 Drawing Sheets

| SCAN | INPUT STATUS | X SIDE LIGHT BLOCKING REGION | Y SIDE LIGHT BLOCKING REGION | LIGHT BLOCKING STORING SECTION (DETECTED INPUT REGION) | | OUTPUT (x,y) | ONE-AXIS FLAG | TWO-AXIS FLAG |
|---|---|---|---|---|---|---|---|---|
| 1 | NO INPUT | | | | | NO OUTPUT | | |
| 2 | P₁ | P₁(33-37) | P₁(24-26) | | | NO OUTPUT | | F |
| 3 | P₁ | P₁(33-37) | P₁(24-26) | X(33-37) | Y(24-26) | P₁(70,50) | | |
| 4 | P₁ | P₁(31-34) | P₁(25-27) | X(31-34) | Y(25-27) | P₁(65,52) | | |
| 5 | P₁,P₂ | P₁(31-31) | P₁(25-27),P₂(7-9) | " | | NO OUTPUT | | |
| 6 | P₁,P₂ | P₁(29-30),P₂(7-9) | P₁(25-27),P₂(8-10) | " | | NO OUTPUT | | F |
| 7 | P₁,P₂ | P₁(31-31),P₂(8-10) | P₁(25-27),P₂(8-10) | X(8-10,31) | Y(8-10,25-27) | P₂(18,18) | | |
| 8 | P₁,P₂ | P₁(31-32),P₂(9-11) | P₁(25-27),P₂(8-10) | X(9-11,31-32) | Y(8-10,25-27) | P₂(20,18) | | |
| 9 | P₁,P₂ | P₁(31-34),P₂(12-14) | P₁(27-30),P₂(8-10) | X(12-14,31-34) | Y(8-10,27-30) | P₂(26,18) | | F |
| 10 | P₁ | P₁(31-33) | P₁(27-30) | " | | NO OUTPUT | | |
| 11 | P₁ | P₁(32-33) | P₁(27-29) | X(32-33) | Y(27-29) | P₁(65,56) | | |
| 12 | P₁ | P₁(33-33) | P₁(27-28) | X(33) | Y(27-28) | P₁(66,55) | | |
| 13 | P₁ | | P₁(27-28) | " | | NO OUTPUT | F | F |
| 14 | NO INPUT | | | | | NO OUTPUT | | |
| 15 | NO INPUT | | | | | NO OUTPUT | | |

FIG. 4

| SCAN | INPUT STATUS | X SIDE LIGHT BLOCKING REGION | Y SIDE LIGHT BLOCKING REGION | LIGHT BLOCKING STORING SECTION (DETECTED INPUT REGION) | | OUTPUT (x,y) | ONE-AXIS FLAG | TWO-AXIS FLAG |
|---|---|---|---|---|---|---|---|---|
| 1 | NO INPUT | | | | | NO OUTPUT | | |
| 2 | P₁ | P₁(33–35) | P₁(23–25) | | | " | | F |
| 3 | P₁ | P₁(33–37) | P₁(24–26) | X(33–37) | Y(24–26) | P₁(70,50) | | |
| 4 | P₁,P₂ | P₁(31–34) | P₁(25–27),P₂(7–8) | | | " | F | |
| 5 | P₁,P₂ | P₁,P₂(31–35) | P₁(25–27),P₂(8–9) | X(31–35) | Y(8–9,25–27) | P₂(66,17) | | |
| 6 | P₁,P₂ | P₁,P₂(31–34) | P₁(25–28),P₂(8–9) | X(31–34) | Y(8–9,25–28) | P₂(65,17) | | |
| 7 | P₁,P₂ | P₁,P₂(30–33) | P₁(24–27),P₂(10–11) | X(30–33) | Y(10–11,24–27) | P₂(63,21) | | |
| 8 | P₁ | P₁(31–32) | P₁(25–27) | " | | P₁(62,52) | F | |
| 9 | P₁ | P₁(31–31) | P₁(25–27) | X(31) | Y(25–27) | " | | |
| 10 | NO INPUT | | | | | | | |
| 11 | NO INPUT | | | | | NO OUTPUT | | |

FIG.7

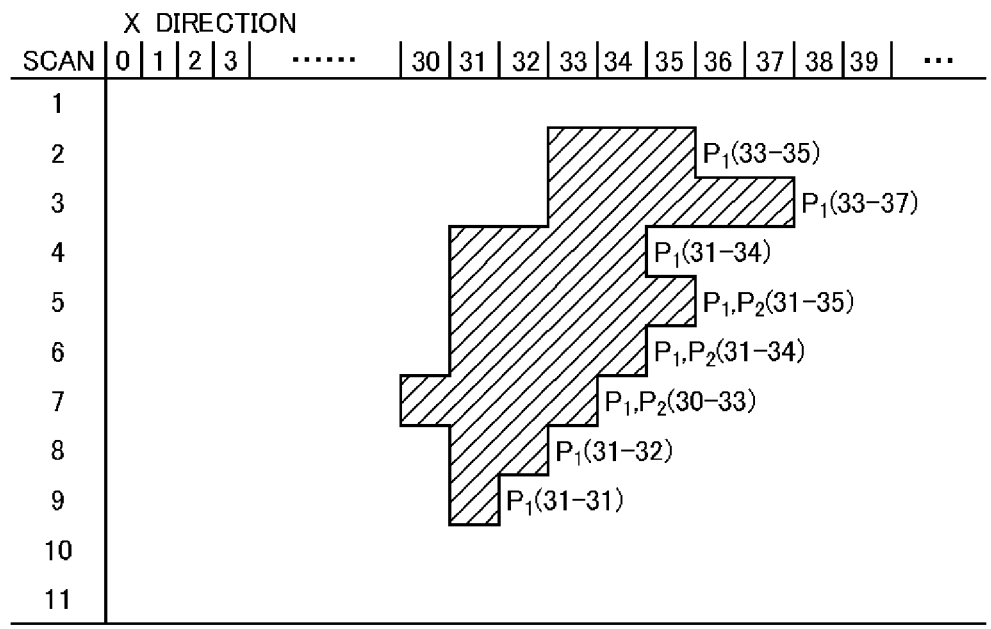
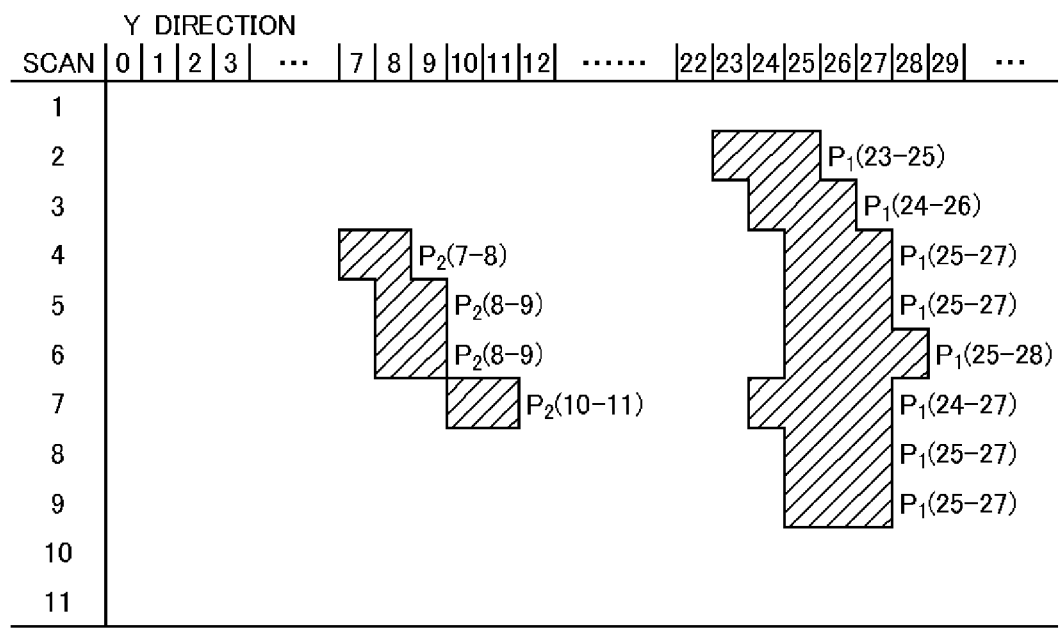
FIG. 8

METHOD OF OUTPUTTING INPUT POSITION OF TOUCH PANEL

CROSS REFERENCE TO RELATED APPLICATION

The contents of the following Japanese patent application is incorporated herein by reference,
NO. 2010-078173 filed on Mar. 30, 2010.

BACKGROUND

1. Technical Field

The present invention relates to a method of outputting an input position of a touch panel for detecting an input operation on the touch panel in orthogonal X and Y directions and outputting the input position. In particular, the present invention relates to a method of outputting an input position of a touch panel for outputting an input position even when input operations are made on a plurality of points on the touch panel.

2. Description of the Related Art

A touch panel that is combined with a liquid crystal display or other display panel for displaying icons, detects an input operation on the icons, and outputs the input position has been conventionally known. Such a type of touch panel 100 will be described below with reference to FIG. 9. The touch panel 100 includes a plurality of light emitting elements 104, 104, ... which are attached at regular intervals along two sides in orthogonal X and Y directions in a rectangular frame 101. All the light emitting elements 104 emit light in succession along the X and Y directions, so that X scan optical paths and Y scan optical paths are formed in a matrix pattern in an instruction input area 101A inside the rectangular frame 101.

A plurality of light receiving elements 105, 105, ... are attached to the rectangular frame 101 at positions opposed to the respective light emitting elements 104 across the instruction input area 101A. The light receiving elements 105 are configured to receive light beams emitted from the opposed light emitting elements 104. When there is no input operation, all the light receiving elements 105, 105, ... receive the light beams at the emission timing of the opposed light emitting elements 104 within a scan cycle where all the light emitting elements 104, 104, ... emit light in succession.

A liquid crystal display panel 103 for showing displays 102 such as icons is arranged inside the instruction input area 101A of the rectangular frame 101. An operator makes an input operation by bringing a pen, finger, or other operating member closer, using the displays 102 as guidelines. When the operator brings the operating member closer to a desired display 102, the optical paths that pass the input position are blocked. The light receiving elements 105 on those optical paths do not receive light at the emission timing of the opposed light emitting elements 104, from which the x- and y-coordinates of the input position are detected. The input position expressed by the x- and y-coordinates is output to a not-shown processing apparatus. The regions 106 where the icons 102 are displayed are previously associated with predetermined commands which are represented by the icons 102. Receiving the input position in a certain region 106 from the touch panel 100, the processing apparatus performs the processing represented by the icon 102 that is associated with the region 106.

Such a touch panel 100 is not capable of identifying input positions when input operations are simultaneously made on two or more different positions in the instruction input area 101A. For example, as shown in the diagram, simultaneous input operations on two locations "a" and "b" block two optical paths in the X and Y directions each. The input positions are indistinguishable from those of input operations on "c" and "d," and it has been not possible for the touch panel 100 to identify and output the input positions.

In order to solve the problem, the present assignee has filed a patent application for a method of outputting an input position of a touch panel, the method including: establishing a region 107 of composite output mode in an instruction input area 101A as shown in FIG. 10; and outputting input positions of two simultaneous input operations (Japanese Patent No. 3986994 (paragraphs [0048] to [0052] and FIG. 3)). According to the method of outputting an input position, when optical paths that pass the certain region 107 in the instruction input area 101A are blocked, an input position in the region 107 identified from the blocked position is output as a first input position. An input position detected from the instruction input area 101A other than the region 107 is further output as a second input position. That is, when making simultaneous inputs on two positions, the operator makes the input operation by selecting any one of icons 108 displayed in the certain region 107 and simultaneously selecting an icon 109 displayed outside the region 107.

The present assignee has also filed a patent application for a method of outputting an input position of a touch panel, the method including: storing a first input position that is detected first in an input region; when a second input position different from the first input position is detected, estimating a direction of the second input position from the first input position and monitoring movement of the second input position; and outputting the first input position and the second input position simultaneously (Japanese Patent Application Publication No. 2009-301250 (paragraphs [0014] and [0015] and FIG. 1)).

According to the method of outputting an input position described in Japanese Patent No. 3986994, the instruction input area 101A includes the region 107 which is intended for the acceptance of two input positions. When an input operation on a single position is intended, the operator therefore needs to inconveniently avoid the region 107 when making the input operation. If an input operation is accidentally made on the region 107, the touch panel waits for an input operation on another input position. There has thus been the problem that no input position will be output unless input operations are made on two positions.

The method of outputting an input position described in Japanese Patent Application Publication No. 2009-301250 outputs two different input positions. When a foreign object is placed on a position other than the intended input positions of the operator's input operations or when the operator's elbow or sleeve approaches, such a position can be misidentified as an input position. There have thus been the problems that a command that is associated with a combination of two input positions including the misidentified one may be executed, and that a command associated with the input positions of the intended input operations may fail to be executed.

It is extremely difficult for an operator to make simultaneous input operations on three or more different positions. No command is thus assumed or associated with such input operations. An input operation on the touch panel, however, can be accompanied by the touching of more than one location such as elbows and sleeves aside from the input position of the input operation, resulting in the detection of three or more input positions. In such a case, there has been no other way than to make an input error display to inform the operator and prompt the operator to make an input operation again.

In addition, the method of outputting an input position described in Japanese Patent Application Publication No.

2009-301250 is not capable of detection and entails error processing when the two different input positions of the simultaneous input operations fall on the same axis, overlapping in the X direction or Y direction.

SUMMARY

The present invention has been achieved in view of the foregoing conventional problems. It is thus an object of the present invention to provide a method of outputting an input position of a touch panel which can output an input position intended by the operator even if two or more different input positions are detected.

Another object of the present invention is to provide a method of outputting an input position of a touch panel which can detect two different input positions that overlap in either one of the X direction and Y direction, and output one of the input positions.

To achieve the foregoing objects, the method of outputting an input position of a touch panel according to claim 1 is a method of outputting an input position of a touch panel including repeating a scan to scan a plurality of X input detection elements arranged in an X direction and a plurality of Y input detection elements arranged in a Y direction of the touch panel in a single scan cycle, thereby detecting an X side input region EX from an arranged position or positions of one or a plurality of adjoining X input detection elements that detect(s) an input in the Y direction, detecting a Y side input region EY from an arranged position or positions of one or a plurality of adjoining Y input detection elements that detect(s) an input in the X direction, and outputting position coordinates including a position x in the X side input region EX and a position y in the Y side input region EY as an input position. The method includes: storing, when a first X side input region EX1 in the X direction and a first Y side input region EY1 in the Y direction are detected in a single scan cycle, the first X side input region EX1 and the first Y side input region EY1 as detected input regions, and outputting a position x1 in the first X side input region EX1 and a position y1 in the first Y side input region EY1 as a first input position; and when a second X side input region EX2 in the X direction and a second Y side input region EY2 in the Y direction are detected in a scan cycle subsequent to the scan cycle where the first X side input region EX1 and the first Y side input region EY1 are detected, stopping outputting the first input position, and outputting a position x2 in the second X side input region EX2 and a position y2 in the second Y side input region EY2 as a second input position, the second X side input region EX2 and the second Y side input region EY2 overlapping with neither of the first X side input region EX1 and the first Y side input region EY1 stored as the detected input regions.

The first X side input region EX1 and the first Y side input region EY1 stored as the detected input regions are ones detected as a result of the input operation on the first input position. The positions x2 and y2 of the second input position can thus be output on the basis of the second X side input region EX2 and the second Y side input region EY2 which overlap with neither of the first X side and Y side input regions EX1 and EY1.

The first input position is output as a sole input position until the second input position is output. When the second input position is output, the output of the first input position is stopped. What is output is always one input position even if input operations are simultaneously made on two positions. Consequently, the input operation on the second input position can initiate a predetermined command that is associated with the second input position even when an accidental input operation is being made on the other, first input position.

In the method of outputting an input position of a touch panel according to claim 2, when an (n+1)th X side input region EX(n+1) and an (n+1)th Y side input region EY(n+1) that overlap with none of all X side input regions EX1 to EXn and Y side input regions EX1 to EYn stored as detected input regions are detected in a scan cycle subsequent to the scan cycle where the nth X side input region EXn and the nth Y side input region EYn are detected, all the X side input regions EX1 to EX(n+1) and the Y side input regions EY1 to EY(n+1) detected are stored as the detected input regions, an nth input position stops being output, and a position x(n+1) in the (n+1)th X side input region EX(n+1) and a position y(n+1) in the (n+1)th input region EY(n+1) are output as an (n+1)th input position, where n is an arbitrary positive integer.

The nth X side input region EXn and the nth Y side input region EYn stored as the detected input regions are ones detected during the input operation on the nth input position. The positions x(n+1) and y(n+1) of the (n+1)th input position can thus be output on the basis of the (n+1)th X side input region EX(n+1) and the (n+1)th Y side input region EY(n+1) which overlap with none of the other input regions. Even if an input position stops being output, the corresponding input regions are stored as the detected input regions as long as the input operation is being made on the input position. It is therefore possible to detect a new input position even when input operations are made on two or more input positions.

The nth input position is output as a sole input position until the (n+1)th input position is output. When the (n+1)th input position is output, the output of the nth input position is stopped. What is output is always one input position even if input operations are simultaneously made on two or more positions. Consequently, the input operation on the (n+1)th input position can initiate a predetermined command that is associated with the (n+1)th input position even if accidental input operations are being made on the other, plurality of input positions.

When the nth input position is output as the latest input position and the input operations on the (n−1)th and previous input positions are released, the corresponding input regions are excluded from the X input region EXn and the Y input region EYn stored as the detected input regions. When an input operation is made on the same position where an input operation has been released, the latest input position is output again as the (n+1)th input position.

In the method of outputting an input position of a touch panel according to claim 3, when the second X side input region EX2 in the X direction and the second Y side input region EY2 in the Y direction either one of which overlaps with either one of the first X side input region EX1 and the first Y side input region EY1 stored as the detected input regions continue being detected in consecutive scan cycles subsequent to the scan cycle where the first X side input region EX1 and the first Y side input region EY1 are detected, the first input position stops being output, and the position x2 in the second X side input region EX2 and the position y2 in the second Y side input region EY2 are output as the second input position.

When such an additional input operation is made on the second input position that overlaps with the first input position in either one of the X and Y directions, at least either one of the second X side input region EX2 and the second Y side input region EY2 overlaps with either one of the first X side input region EX1 and the first Y side input region EY1 in consecutive scan cycles. Either the second X side input region EX2 or the second Y side input region EY2 is detected during the scanning of the X input detection elements and the Y input detection elements. The second input position can thus be determined to overlap with either one of the first X side input region EX1 and the first Y side input region EY1 in a single scan cycle.

In the method of outputting an input position of a touch panel according to claim 4, when an (n+1)th X side input region EX(n+1) in the X direction and an (n+1)th Y side input region EY(n+1) in the Y direction either one of which overlaps with any one of all X side input regions EX1 to EXn and Y side input regions EX1 to EYn stored as detected input regions continue being detected in consecutive scan cycles subsequent to the scan cycle where the nth X side input region EXn and the nth Y side input region EYn are detected, all the X side input regions EX1 to EX(n+1) and the Y side input regions EY1 to EY(n+1) detected are stored as the detected input regions, an nth input position stops being output, and a position x (n+1) in the (n+1)th X side input region EX(n+1) and a position y(n+1) in the (n+1)th input region EY(n+1) are output as an (n+1)th input position, where n is an arbitrary positive integer.

When such an additional input operation is made on the (n+1)th input position that overlaps with any one of all the X side input regions EX1 to EXn and the Y side input regions EY1 to EYn stored as the detected input regions in either one of the X and Y directions, at least either one of the (n+1)th X side input region EX(n+1) and the (n+1)th Y side input region EY(n+1) overlaps with any one of all the X side input regions EX1 to EXn and the Y side input regions EY1 to EYn stored as the detected input regions in consecutive scan cycles. Either the (n+1)th X side input region EX(n+1) or the (n+1)th Y side input region EY(n+1) is detected during the scanning of the X input detection elements and the Y input detection elements. The (n+1)th input position can thus be determined to overlap with any one of the X side input regions EX1 to EXn and the Y side input regions EY1 to EYn in a single scan cycle.

In the method of outputting an input position of a touch panel according to claim 5, when the arranged positions of an X input detection element and a Y input detection element that detect an input when the X side input region EX and the Y side input region EY are detected in a predetermined scan cycle and the arranged positions of an X input detection element and a Y input detection element that detect an input when an X side input region EX' and a Y side input region EY' are detected in the scan cycle immediately after adjoin to or overlap with each other in the X direction and the Y direction, the inputs are determined to be a moving input, the X side input region EX and the Y side input region EY stored as the detected input regions are replaced with the X side input region EX' and the Y side input region EY' and stored, and a position x' in the X side input region EX' and a position y' in the Y side input region EY' are output as an input position.

When the arranged positions of the X input detection elements and Y input detection elements that detect inputs adjoin to or overlap with each other in the X direction and the Y direction, the inputs are determined to be a moving input that is made by the same input operation. The X side input region EX' and the Y side input region EY' resulting from the new input position are stored as detected input regions, and the moved positions x' and y' are output as a new input position.

In the method of outputting an input position of a touch panel according to claim 6, a center of the arranged positions of X input detection elements arranged at both sides in the X direction of two or more adjoining X input detection elements that detect an input when the X side input region EX is detected is assumed as the position x, and a center of the arranged positions of Y input detection elements arranged at both sides in the Y direction of two or more adjoining Y input detection elements that detect an input when the Y side input region EY is detected is assumed as the position y.

Since the respective center positions of the X input detection elements and Y input detection elements that detect the input are assumed as the input positions x and y, the input positions x and y will not vary largely even if the input regions increase or decrease in width.

According to the invention of claim 1, only a first input position is output when the operator intentionally makes an input operation on the first input position. Even when a first input position is erroneously detected aside from a second input position on which the operator intentionally makes an input operation, it is possible to output only the second input position as an input position without error processing.

In particular, even if a position the operator's elbow or sleeve touches is erroneously detected, it is possible to make input operations on the touch panel without being aware of the erroneous detection unless predetermined commands are stored in association with regions of the touch panel where accidental inputs are likely to occur due to the touching of the operator's elbow or sleeve.

According to the invention of claim 2, only an (n+1)th input position is output when the operator intentionally makes an input operation on the (n+1)th input position. Even when a plurality of input positions are erroneously detected before that input operation, it is possible to output only the (n+1)th input position as an input position without error processing.

Moreover, suppose that the operator who is making accidental inputs on a plurality of unintended input positions repeats an input operation and its release a plurality of times on an intended (n+1)th input position. Even in such a case, the (n+1)th input position is always output upon each latest input operation. This makes it possible to associate and execute a predetermined command with a so-called tapping input where input operations are made at a predetermined interval.

According to the invention of claim 3, when an input operation is made on the second input position that overlaps with the first input position in either one of the X and Y directions, it is possible to output the second input position, being distinguished from the case where the input region in either one of the X and Y directions is detected during the scanning of the X input detection elements and the Y input detection elements.

Now, suppose that, when an nth input position is being output, a new input operation is made on an (n+1)th input position that overlaps with any one of the input positions whose input regions are stored as the detected input regions in either one of the X and Y directions. According to the invention of claim 4, it is possible even in such a case to output the (n+1)th input position, being distinguished from the case where the input region in either one of the X and Y directions is detected during the scanning of the X input detection elements and the Y input detection elements.

According to the invention of claim 5, it is possible to detect a moving input operation that is intended by the operator and execute a predetermined command that is associated with the moving input operation even if input operations are simultaneously made on a plurality of positions.

According to the invention of claim 6, it is possible to output the input position x, y with a smaller error even if the input regions vary in width due to the pressing force of the input operation.

BRIEF DESCRIPTION OF THE DRAWINGS

FIG. 4 is an explanatory diagram showing the process of detecting the input operations $P_1$ and $P_2$ of FIG. 3 and outputting an input position.

FIG. 7 is an explanatory diagram showing the process of detecting the input operations $P_1$ and $P_2$ of FIG. 6 and outputting an input position.

FIG. 8 is an explanatory diagram showing light blocking regions (detected input regions) resulting from the input operations $P_1$ and $P_2$ of FIG. 6.

DESCRIPTION OF EXEMPLARY EMBODIMENTS

Figure 1:
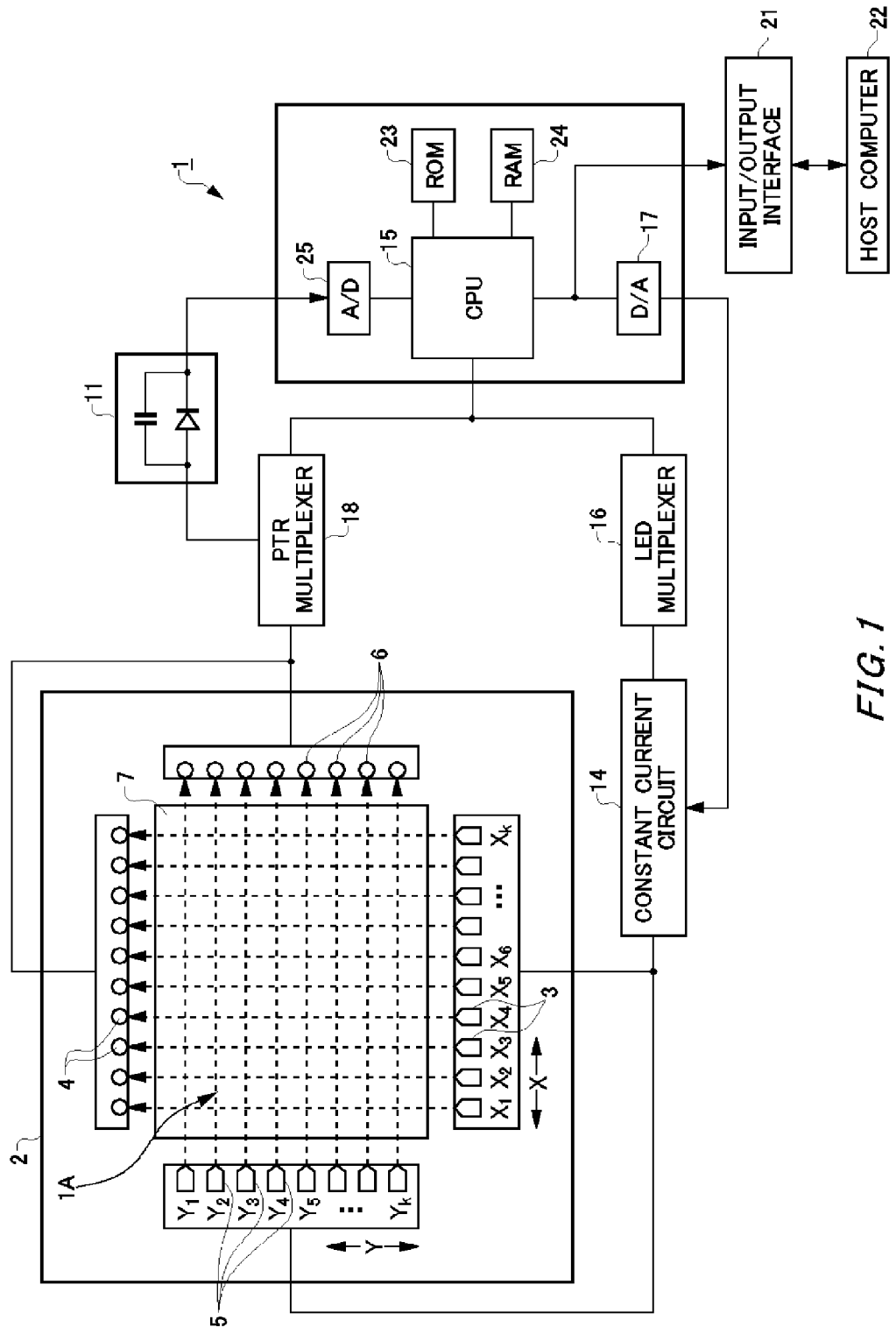
FIG. 1 is a block diagram of a touch panel 1 that implements the method of outputting an input position of a touch panel.

Hereinafter, the configuration of a touch panel 1 which implements the method of outputting an input position of a touch panel according to the present invention will be described with reference to FIG. 1. The touch panel 1 shown in FIG. 1 is a touch panel of so-called optical type which is used for an instruction input apparatus of an automatic teller machine. A large number of X light emitting elements 3 (X1, X2, . . . Xk) are arranged in the X direction at regular pitches on the bottom side of a rectangular case 2 in the diagram. Here, 50 (k=50) X light emitting elements 3 are arranged at pitches of 6.6 mm. A large number of X light receiving elements 4 (X1, X2, . . . , Xk) are arranged on the top side of the case 2 across an input operation region 1A so as to be opposed to the respective X light emitting elements 3. A large number of Y light emitting elements 5 (Y1, Y2, . . . Yk) are arranged in the Y direction at regular pitches on the left side of the case 2 in the diagram. Here, 40 (k=40) Y light emitting elements 5 are arranged at pitches of 6.6 mm. A large number of Y light receiving elements 6 (Y1, Y2, . . . , Yk) are arranged on the right side of the case 2 across the input operation region 1A so as to be opposed to the respective Y light emitting elements 5.

In such an arrangement, the X light emitting elements 3 and the X light receiving elements 4 are scanned in the direction of the X-axis in order of X1, X2, . . . , Xk. The Y light emitting elements 5 and the Y light receiving elements 6 are scanned in the direction of the Y-axis in order of Y1, Y2, . . . , Yk. Such a single round of scan (hereinafter, referred to as a scan cycle) will be repeated. Here, a scan cycle has a period of 30 msec. The scan cycle is repeated at every 30 msec. When the light emitting elements 3 and 5 are scanned for light emission in succession, a matrix of scanning optical paths shown by the broken lines in FIG. 1 is formed in the input operation region 1A. When an operator puts a pen or finger into the input operation region 1A for input operation, X- and Y-direction light beams that pass the input position are blocked.

The large number of X light emitting elements 3 and Y light emitting elements 5 arranged in the X and Y directions of the input operation region 1A are composed of LEDs which are connected to a constant current circuit 14. The LEDs emit a light beam when a constant current flows. Through the constant current circuit 14, the X light emitting elements 3 and the Y light emitting elements 5 are also connected to an LED multiplexer 16 which is under the individual connection control of a CPU 15. The constant current circuit 14 is also connected to the CPU 15 through a D/A converter 17. The CPU 15 thereby passes a drive current to each of the light emitting elements 3 and 5 in arranged order at the foregoing scan timing for light beam emission.

The plurality of X light receiving elements 4 and Y light receiving elements 6 opposed to the respective plurality of light emitting elements 3 and 5 across the input operation region 1A are each composed of a phototransistor which receives a light beam and outputs a light receiving signal. The light receiving elements 4 and 6 are connected to a Ptr multiplexer 18, where their connections to an integrator circuit 11 are individually controlled by the CPU 15. The CPU 15 connects the light receiving element 4 or 6 that is opposed to the light emitting element 3 or 5 through which the drive current is passed for light emission control, to the integrator circuit 11 in synchronization with the light emission control. The output of the integrator circuit 11 is input to the CPU 15 through an A/D converter 25. Unless any light beam is blocked in the input operation region 1A, i.e., if there is no input operation, the CPU 15 gets the light receiving signals output from the light receiving elements 4 and 6 through the integrator circuit 11 at the timing of light emission control on the respective opposed light emitting elements 3 and 5.

If an input operation is made on the input operation region 1A, X- and Y-direction light beams that pass the input position are blocked. The CPU 15 determines the x- and y-coordinates that indicate the input position where the operator made the input operation, on the basis of the arranged positions of the light receiving elements 4 and 6 from which no light receiving signal is input. The CPU 15 outputs the x- and y-coordinates to a host computer 22 through an input/output interface 21. The method by which the CPU 15 determines the input position will be detailed later.

The CPU 15 is connected with a ROM 23, which contains a program for performing the foregoing operation of the CPU 15. A RAM 24 is a storing unit which stores X side input regions EX and Y side input regions EY to be described later.

A liquid crystal display panel 7 covered with a transparent protective plate is arranged in the input operation region 1A. The liquid crystal display panel 7 displays not-shown input operation information that describes a predetermined command on the automatic teller machine. An input operation area is virtually assumed in the input operation region 1A so as to correspond to the display position of the input operation information. The input operation area is associated with the predetermined command on the automatic teller machine.

When the operator views the input operation information displayed on the liquid crystal panel 7 and brings a finger or pen close to the position where the input operation information is displayed in the input operation region 1A, the input position is output from the CPU 15 to the host computer 22. This initiates the command that is associated with the input operation area including the input position and is described by the input operation information.

Hereinafter, a description will be given of the method of outputting an input position by which an input position indicated by x- and y-coordinates is determined and output on the basis of the arranged positions of a plurality of light receiving elements 4 and 6 that receive no light beam from the opposed light emitting elements 3 and 5 (hereinafter, referred to as detecting an input) in the touch panel 1 (CPU 15) of the foregoing configuration. In the method of outputting an input position according to the present invention, the input position of the last input operation alone is output even if a plurality of different positions in the input operation region 1A are simultaneously detected as input positions. More specifically, although some input operations appear to be simultaneously made on a plurality of positions in the input operation region 1A, it is rarely the case that the input operations are simultaneously made within a scan cycle of 30 msec. The method of the present invention is to always output the input position that is detected the latest from among the input positions that are detected in different scan cycles. In the following description, the input position that is the first detected will be referred to as the first input position, and the input position that is the nth detected (n is an arbitrary positive integer) will be referred to as the nth input position.

(X- and Y-Coordinates of the nth Input Position)

Figure 2:
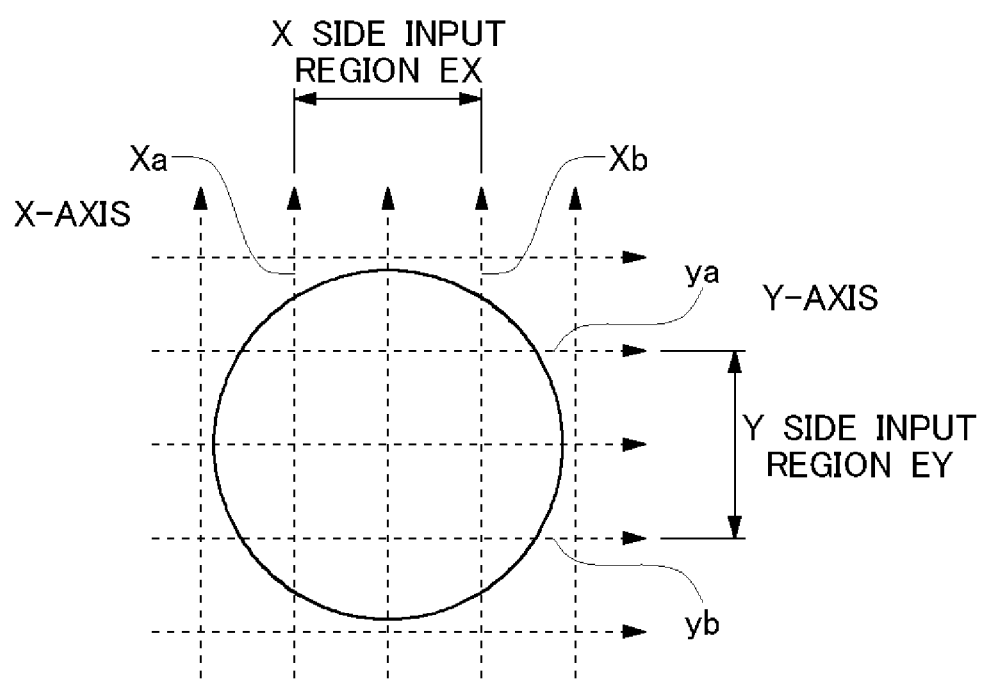
FIG. 2 is an explanatory diagram showing the method for determining the x- and y-coordinates of an input position from the circled light blocking region.

As described above, the light receiving elements 4 and 6 opposed to the respective light emitting elements 3 and 5 are arranged in the X and Y directions at pitches of 6.6 mm. When the operator makes an input operation with his/her finger which is near 2 cm in thickness, two to four adjoining optical paths will be blocked simultaneously. When a plurality of X light receiving elements 4 that detect an input in a single scan cycle are arranged next to each other in the X direction, the region where the group of X light receiving elements 4 are arranged will be assumed as an X side input region EX. Similarly, when a plurality of Y light receiving elements 6 that detect an input are arranged next to each other in the Y direction, the region where the group of Y light receiving elements 6 are arranged will be assumed as a Y side input region EY. The x-coordinate of the input position is determined from the X side input region EX, and the y-coordinate of the input position is determined from the Y side input region EY. As shown in FIG. 2, an intermediate position between the arranged positions Xa and Xb of the X light receiving elements 4 and 4 at both sides of the X side input region EX in the X direction, (Xa+Xb)/2, shall be the x-coordinate of the input position.

An intermediate position between the arranged positions Ya and Yb of the Y light receiving elements 6 and 6 at both sides of the Y side input region EY in the Y direction, (Ya+Yb)/2, shall be the y-coordinate. Here, the halving processing will be omitted, and the x-coordinate of the input position will be expressed by (Xa+Xb) and the y-coordinate by (Ya+Yb). If a single X light receiving element 4 (arranged position Xc) or Y light receiving element 6 (arranged position Yc) detects an input, the x-coordinate of the input position is expressed by 2Xc and the y-coordinate by 2Yc accordingly.

(Processing for the Case of Detecting Two Input Positions that Differ both in X and Y Directions)

Figure 3:
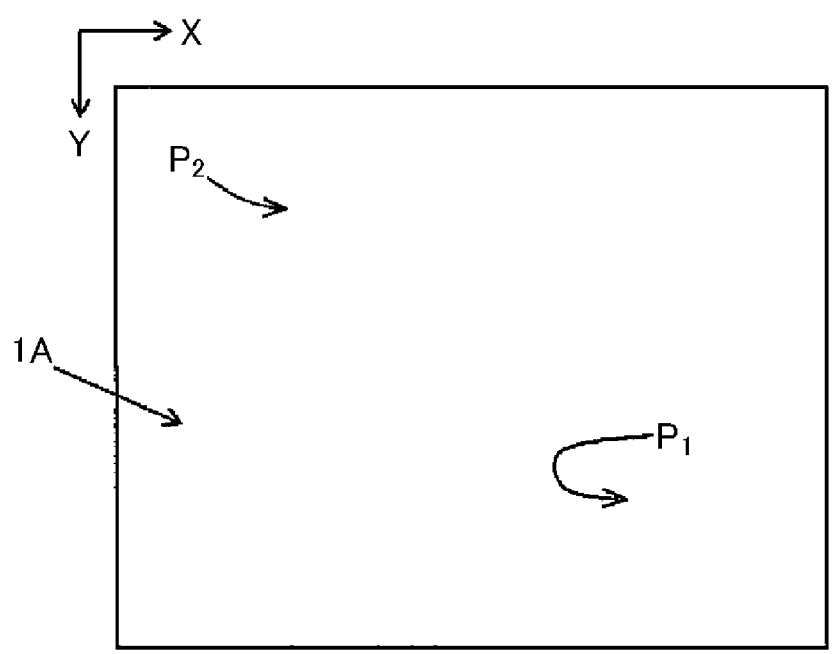
FIG. 3 is a plan view showing input operations $P_1$ and $P_2$ on different input positions in an input operation region 1A.

Referring to FIG. 3, the method of outputting an input position will be described for the case of detecting an input position that results from an input operation $P_1$ on the bottom right corner of the input operation region 1A and an input position that results from an input operation $P_2$ on the top left. The description will be given in order of consecutive scan cycles (scans) in conjunction with FIGS. 4 and 5. Such input operations can occur, for example, in a situation as follows: An operator attempts an input operation on input operation information that is displayed on the top left of the input operation screen (input operation region 1A) of the automatic teller machine, and one of the operator's sleeves approaches the bottom right corner and is misidentified as the input operation $P_1$.

In a standby state where no input operation is made on the touch panel 1, none of the optical paths in the input operation region 1A is blocked. Since all the X light receiving elements 4 and the Y light receiving elements 6 receive light beams from the opposed light emitting elements 3 and 5 within a single scan cycle (scan 1), no input is detected and the CPU 15 outputs no input position. In such a standby state, a light blocking storing section of the RAM 24 for storing detected input regions to be described later is reset and cleared.

Figure 5:
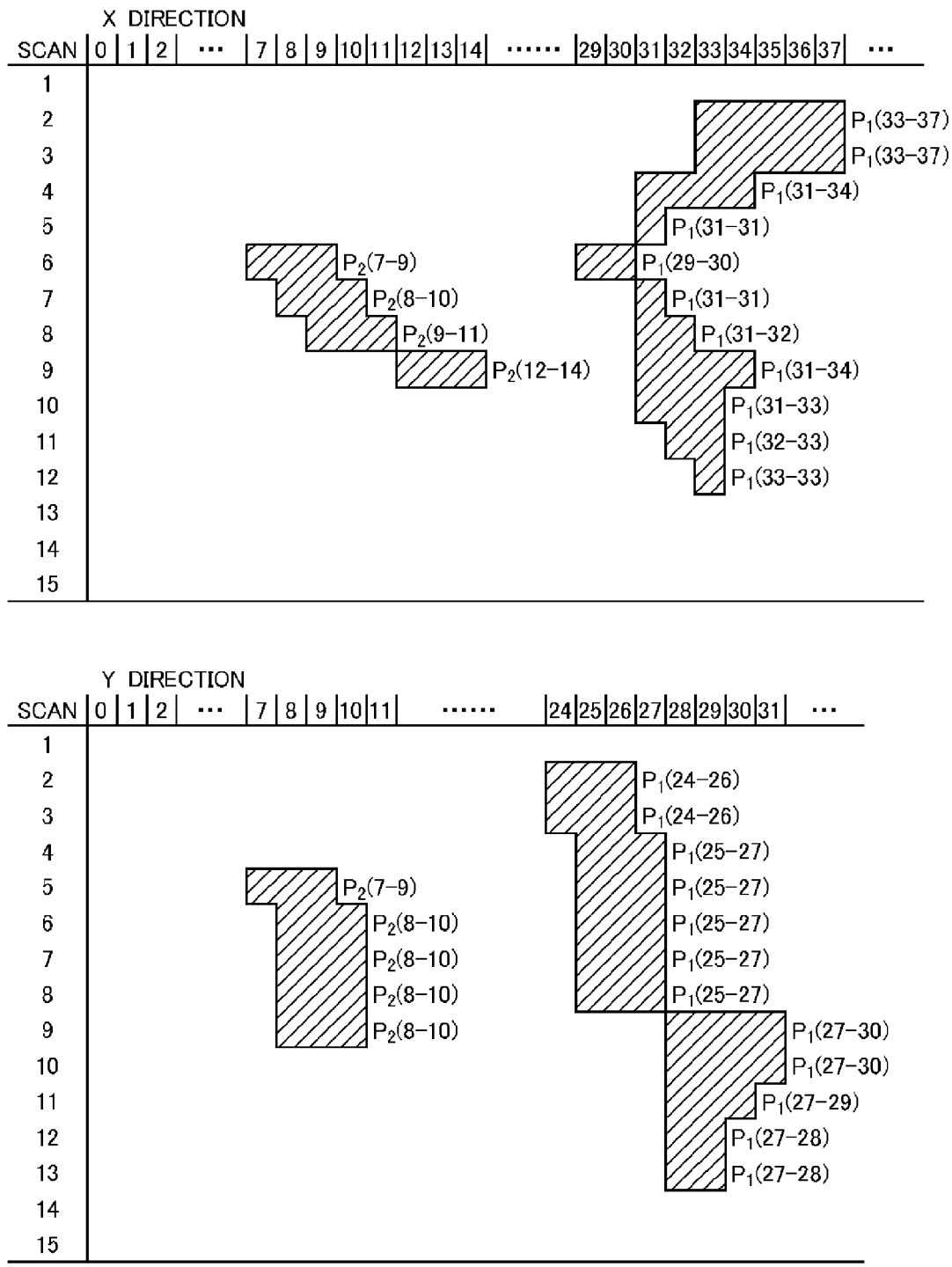
FIG. 5 is an explanatory diagram showing light blocking regions (detected input regions) resulting from the input operations $P_1$ and $P_2$ of FIG. 3.

In the next scan cycle (scan 2), suppose that X light receiving elements 4 at arranged positions X33 to X37 in the X direction and Y light receiving elements at arranged positions Y24 to Y26 in the Y direction detect the input of the input operation $P_1$ (see FIG. 5). The CPU 15 compares the detected X side light blocking region $P_1$(33-37) and Y side light blocking region $P_1$(24-26) with the light blocking storing section of the RAM 24. Since the X side light blocking region $P_1$(33-37) and the Y side light blocking region $P_1$(24-26) are different from the content of the light blocking storing section, which is empty, in both the X and Y directions, a two-axis flag F is stored into the RAM 24. The two-axis flag F indicates the detection of a new input position that differs in both the two directions. At the current phase where the two-axis flag F is stored, the data stored in the RAM 24 is not updated, nor is output an input position.

In scan 3, the detected X side light blocking region $P_1$(33-37) and Y side light blocking region $P_1$(24-26) do not overlap with the content of the light blocking storing section of the RAM 24, which is empty again, in both the X and Y directions. Since the RAM 24 contains the two-axis flag F which indicates that the scan result is the same as the previous one, the CPU 15 stores the detected light blocking regions into the light blocking storing section of the RAM 24 as detected input regions (X(33-37), Y(24-26)). The CPU 15 also outputs an input position $P_1$(70, 50), which is calculated from the X side light blocking region $P_1$(33-37) and the Y side light blocking region $P_1$(24-26) by the method described above, to the host computer 22 through the input/output interface 21. Here, the input position $P_1$(70, 50) shows that the x-coordinate of the input position of the input operation $P_1$ is 33+37=70, and the y-coordinate is 24+26=50.

The host computer 22 determines whether the input position $P_1$(70, 50) falls within a region that is associated with any predetermined command. Here, the host computer 22 makes no response operation in particular because the bottom right corner of the input operation region 1A is not associated with any predetermined command. The operator then continues to make an input operation on the touch panel 1 without knowing that the sleeve is erroneously detected as the input operation $P_1$. If the region including the input position $P_1$(70, 50) is associated with a predetermined command and the host computer 22 executes the command, the operator will notice the accidental input from the display of the command execution (for example, a jump to an unintended page).

Suppose that the input position of the input operation $P_1$ moves, and an X side light blocking region $P_1$(31-34) and a Y side light blocking region $P_1$(25-27) are detected in the next scan 4. The light blocking regions overlap with the detected input regions (X(33-37), Y(24-26)) stored in the RAM 24 both in the X and Y directions. When the newly detected light blocking regions thus overlap with any of the detected input regions stored in the RAM 24 both in the X and Y directions, the CPU 15 overwrites the detected input regions stored in the RAM 24 with the newly detected light blocking regions (X(31-34), Y(25-27)) without storing a flag. The CPU 15 outputs an input position P$_1$(65, 52) that is determined from the light blocking regions. The host computer 22 repeats the foregoing operation each time a new input position is input.

In the next scan cycle or scan 5, the detected light blocking regions include a new Y side light blocking region P$_2$(7-9) that does not overlap with the detected input regions (X(31-34), Y(25-27)) stored in the RAM 24 in one direction (in scan 5, the Y direction). In such a case, the CPU 15 estimates that another input operation P$_2$ simultaneously made is detected, and stores a one-axis flag F into the RAM 24. The one-axis flag F indicates the detection of a new input position that overlaps in either one of the X and Y directions. At the current phase where the one-axis flag F is stored, the data stored in the RAM 24 is not updated, nor is output an input position. The reason is that there are two possible situations where a new light blocking region overlapping in only one direction can be detected, and it is not possible within a single scan cycle to detect one. The two situations include: where an input operation P$_2$ on an input position that is different in both the two directions is made within a single scan cycle and either X light receiving elements 4 or Y light receiving elements 6 in one direction alone detect the input; and where an input operation P$_2$ is made on an input position that is not different in one direction.

In scan 6, or the scan cycle immediately after scan 5, an X side light blocking region P$_2$(7-9) and a Y side light blocking region P$_2$(8-10) that are different from the detected input regions (X(31-34), Y(25-27)) stored in the light blocking storing section of the RAM 24 in the X and Y directions are detected. This applies to the former situation mentioned above. The CPU 15 stores the two-axis flag F, which indicates the detection of a new input position that is different in both the directions, into the RAM 24. At the current phase where the two-axis flag F is stored, the data stored in the RAM 24 is not updated, nor is output an input position.

It should be noted that the X side light blocking region P$_1$(29-30) simultaneously detected in scan 6 does not strictly overlap with the X side light blocking region P$_1$(31-31) that is detected in scan 5 as shown in FIG. 5. Such an input operation, however, is handled as one made on an overlapping region, assuming that the movement of the input position of the same input operation P$_1$ reaches up to the X light receiving elements 4 that are arranged in adjoining positions in the X direction (X31 and X30). Similarly, Y side light blocking regions where Y light receiving elements arranged in adjoining positions in the Y direction detect an input will be handled as resulting from an input operation on overlapping regions.

In scan 7, X side light blocking regions P$_1$(31-31) and P$_2$(8-10) and Y side light blocking regions P$_1$(25-27) and P$_2$(8-10) are detected. Of these, the X side light blocking region P$_2$(8-10) and the Y side light blocking region P$_2$(8-10) do not overlap with the detected input regions (X(31-34), Y(25-27)) stored in the RAM 24 in the X and Y directions, respectively. Since the RAM 24 contains the two-axis flag F, the CPU 15 determines that a new input operation P$_2$ is detected, and outputs the input position P$_2$(18,18). Based on the light blocking regions detected in scan 7, the detected input regions stored in the light blocking storing section of the RAM 24 are overwritten with X(8-10, 31) and Y(8-10, 25-27). In this way, the touch panel 1 outputs only the input position of the input operation P$_2$ that is detected later, while the input operation P$_1$ is simultaneously detected. The light blocking regions resulting from the input operation P$_1$, whose input position is not output, will be detected in each scan and stored and included in the detected input regions unless the input operation is released. A new input operation P$_3$ and subsequent input operations can thus be detected separately from the input operation P$_1$.

Receiving the input position P$_2$(18, 18), the host computer 22 executes a command that is associated with the region where the input position P$_2$(18,18) is included. The command described by the operator-desired input operation information is thus executed.

In scans 8 and 9, the simultaneous input operations P$_1$ and P$_2$ are detected as moving. The light blocking regions change with the moving positions, and are stored each time into the light blocking storing section of the RAM 24 as detected input regions for update. The moved input positions P$_2$(20, 18) and P$_2$(26, 18) are output to the host computer 22 in succession.

In scan 10, the input operation P$_2$ is released, and only an X side light blocking region P$_1$(31-33) and a Y side light blocking region P$_1$(27-30) resulting from the input operation P$_1$ are detected. Since the detected input regions (X(12-14), Y(8-10)) stored in the light blocking storing section of the RAM 24 do not overlap with the light blocking regions detected, the CPU 15 stores a two-axis flag F into the RAM 24. The two-axis flag F indicates the elimination of the input position that is different in both the X and Y directions. Since the two-axis flag F is stored, the data stored in the RAM 24 is not updated, nor is output an input position.

In the next scan 11, neither of the light blocking regions detected overlaps with the detected input regions (X(12-14), Y(8-10)) stored in the light blocking storing section of the RAM 24. Since the RAM 24 contains the two-axis flag F, the CPU 15 determines that the input operation P$_2$ whose input position has been output is released. The CPU 15 outputs an input position P$_1$(65, 56) which is determined from the light blocking regions detected at that time. If a plurality of input positions are included in the light blocking regions detected, the input position that was output the latest will be output.

In scan 12, the input operation P$_1$ whose input position is being output again is detected as moving. The light blocking regions change with the moving position, and are stored into the light blocking storing section of the RAM 24 as detected input regions for update. The moved input position P$_1$(66, 55) is output to the host computer 22.

In scan 13, the input operation P$_1$ is released. Only the X light receiving elements 4 in the X direction detect the release in that scan cycle, so that no overlapping light blocking region is detected in one direction (in scan 13, the X direction) of the detected input regions (X(33), Y(27-28)). In such a case, a one-axis flag F is stored into the RAM 24, which indicates the inclusion of an input position that does not overlap in either one of the X and Y directions. Since the one-axis flag F is stored, the data stored in the RAM 24 is not updated, nor is output an input position.

In scan 14, no light blocking region is detected. There is no overlap with the detected input regions in either of the X and Y directions. A two-axis flag F is stored into the RAM 24, the data stored in the RAM 24 is not updated, and no input position is output.

In scan 15, no light blocking region is detected as in scan 14 where the two-axis flag F is stored. It is determined that no input operation is detected on any position in the input operation region 1A, and the touch panel 1 (CPU 15) returns to the standby state to wait for an input operation.

(Processing for the Case of Detecting Two Input Positions that Differ in Either One of X and Y Directions)

Figure 6:
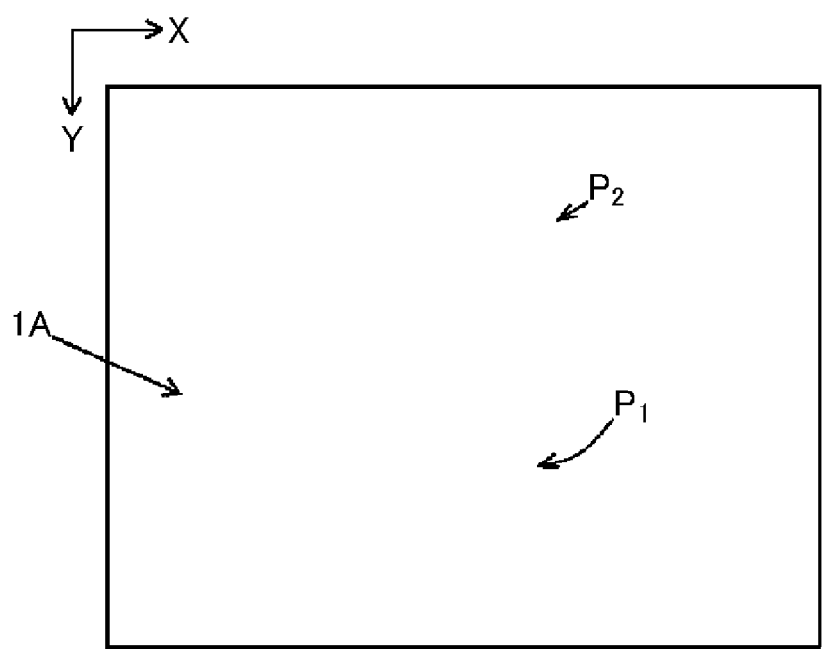
FIG. 6 is a plan view showing input operations $P_1$ and $P_2$ on input positions that overlap in the X direction in the input operation region 1A.
Figure 9:
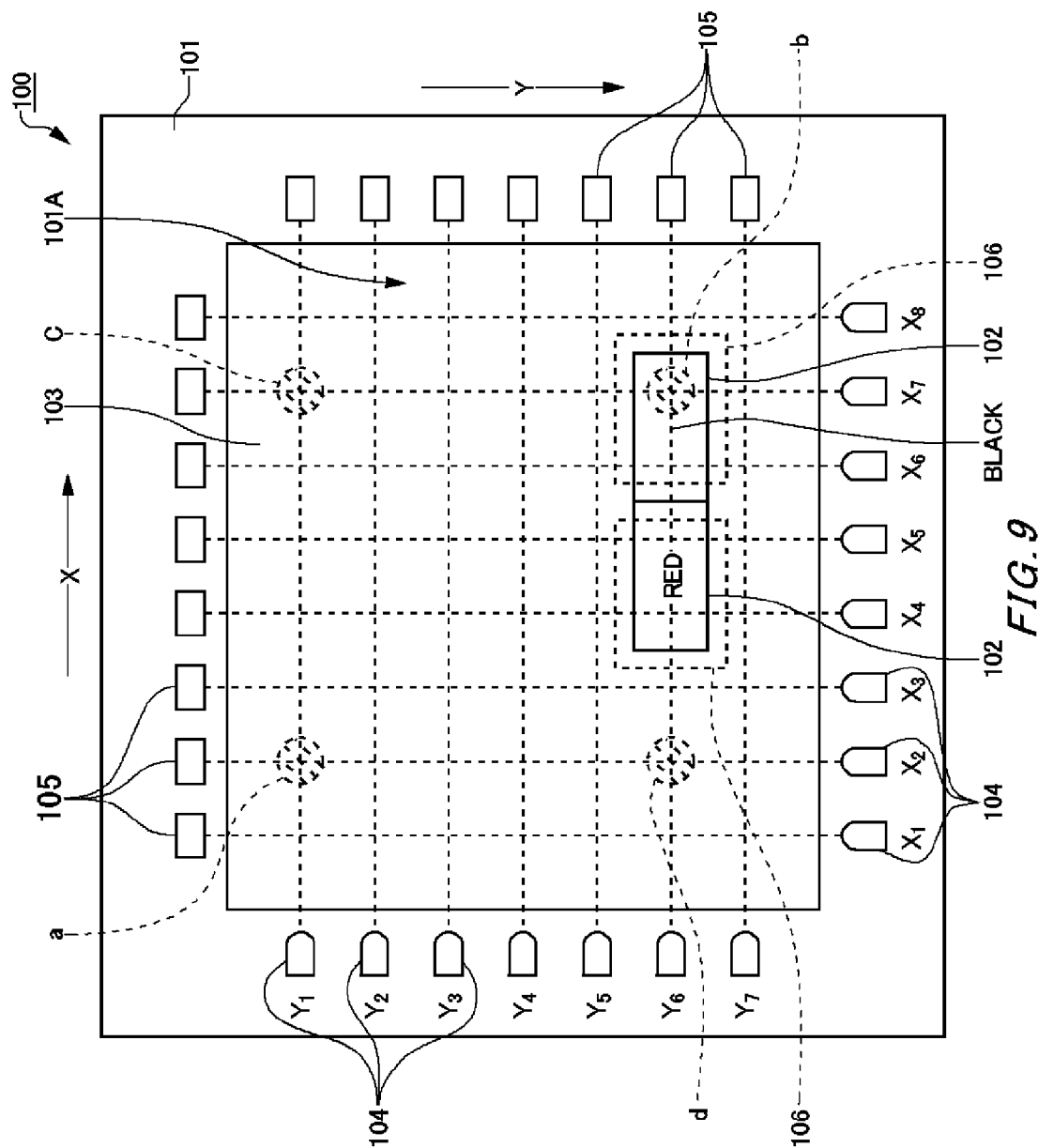
FIG. 9 is a plan view showing a conventional touch panel 100.
Figure 10:
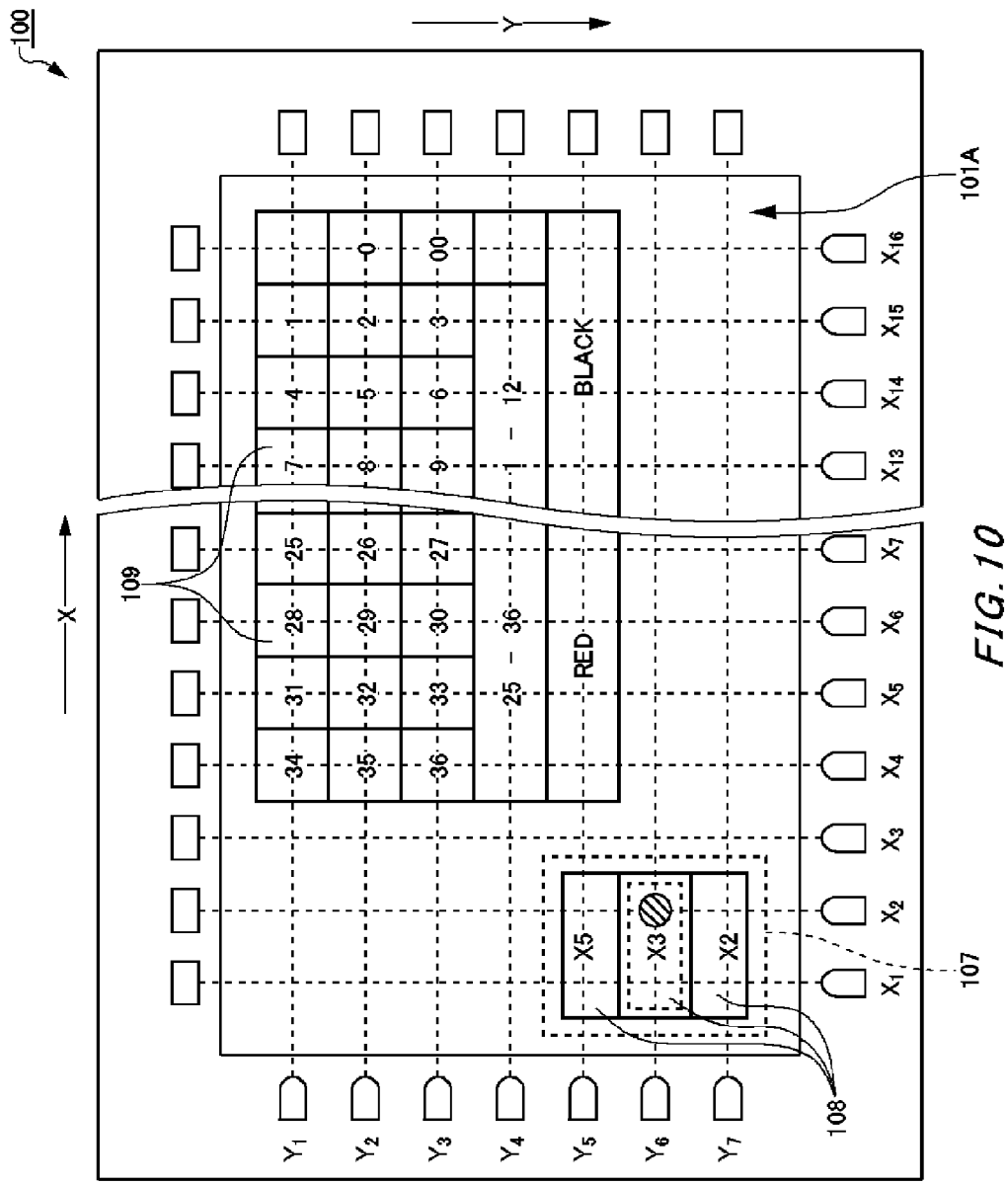
FIG. 10 is a plan view showing the method of outputting input positions of a conventional touch panel.

Referring to FIG. 6, the method of outputting an input position will be described for the case of detecting an input position that results from an input operation P$_1$ on the bottom right corner of the input operation region 1A and an input position that results from an input operation $P_2$ above in the Y direction. Here, the description will be given in order of consecutive scan cycles (scans) in conjunction with FIGS. 7 and 8. Such a situation can occur, for example, when the operator attempts an input operation on input operation information that is displayed on the top right of the input operation screen (input operation region 1A) of the automatic teller machine, and one of his/her sleeves approaches the bottom right corner and is misidentified as the input operation $P_1$.

The process of scans 1 to 3, up to the output of the input position of the input operation $P_1$, is the same as that of scans 1 to 3 in FIG. 4 seen above. The process will be shown in FIGS. 7 and 8, and a description thereof will be omitted.

As shown in FIG. 7, the light blocking regions detected in scan 4 include a new Y side light blocking region $P_2$(7-8) that does not overlap with the detected input regions (X(33-37), Y(24-26)) stored in the RAM 24 in one direction (Y direction). In such a case, the CPU 15 estimates that another input operation $P_2$ simultaneously made is detected, and stores a one-axis flag F into the RAM 24. The current phase where the one-axis flag F is stored may apply to the foregoing two cases: where either X light receiving elements 4 or Y light receiving elements 6 in one direction alone detect the input within a single scan cycle; and where the input operation $P_2$ is made on an input position that is not different in one direction. Since the input position is not determined, the detected input regions of the RAM 24 are not overwritten, nor is output a new input position.

In scan 5, or the scan cycle immediately after scan 4, a Y side light blocking region $P_2$(8-9) that is different from the detected input regions (X(33-37), Y(24-26)) stored in the light blocking storing section of the RAM 24 only in the Y direction is detected again. This situation applies to the latter case. Since the RAM 24 contains the one-axis flag F, the CPU 15 determines that there is detected a new input operation $P_2$ that has a region in common with the input operation $P_1$ in the X direction, and outputs the input position $P_2$(66, 17). Based on the light blocking regions detected in scan 5, the detected input regions stored in the light blocking storing section of the RAM 24 are overwritten with X(31-35) and Y(8-9, 25-27). Receiving the input position $P_2$ (66, 17), the host computer 22 executes a command that is associated with the region where the input position $P_2$(66, 17) is included. The command described by the operator-desired input operation information is thus executed.

Even in such a case, the touch panel 1 outputs only the input position of the input operation $P_2$ which is detected later, while the input operation $P_1$ is simultaneously detected. The light blocking regions resulting from the input operation $P_1$, whose input position is not output, will be detected in each scan and stored and included in the detected input regions unless the input operation is released. A new input operation $P_3$ and subsequent input operations can thus be detected separately from the input operation $P_1$. When an input operation is released, the light blocking regions resulting from the released input operation are no longer included in the detected input regions in the subsequent scans. When the input operation is made again, the input position is output as that of the latest detected input operation. Consequently, even if the input position of another input operation is erroneously detected and is being output, it is possible to detect a so-called tapping operation where an input operation on a predetermined position is repeated at a certain interval. A predetermined command can be associated with the tapping operation and executed by the host computer.

In scans 6 and 7, the simultaneous input operations $P_1$ and $P_2$ are detected as moving. The light blocking regions change with the moving positions, and are stored into the light blocking storing section of the RAM 24 as detected input regions for update. The moved input positions $P_2$(65, 17) and $P_2$(63, 21) are output to the host computer 22 in succession.

The operator ends the intended input operation $P_2$ and releases the input operation. In scan 8, only the X side light blocking region $P_1$(31-32) and Y side light blocking region $P_1$(25-27) resulting from the input operation $P_1$ are detected. Since there is no overlap with Y(10-11) of the detected input regions stored in the RAM 24, a one-axis flag F is stored into the RAM 24. Since the one-axis flag F is stored, the data stored in the RAM 24 is not updated, nor is output an input position.

Similarly, in the next scan 9, the detected light blocking regions do not overlap with Y(10-11) of the detected input regions stored in the light blocking storing section of the RAM 24 in one direction. Since the RAM 24 contains the one-axis flag F, the CPU 15 determines that the input operation $P_2$ that results in the light blocking position in the region Y(10-11) is released. The CPU 15 outputs an input position $P_1$(62, 52) which is determined from the light blocking regions detected at that time.

The processing of scans 10 and 11 where the input operation $P_1$ is released further and the touch panel 1 returns to the standby state is the same as that of scans 14 and 15 in FIG. 4 seen above. A description thereof will thus be omitted.

The foregoing embodiment has dealt with the optical touch panel that detects an input position from the blocking of optical paths formed in an XY matrix pattern in the input operation region 1A by an input operation. Nevertheless, touch panels of other detection methods, such as a capacitive touch panel that detects an input position from a change in capacitance at the input position, may be used as long as the touch panels detect the input position of an input operation in terms of positions in the X and Y directions.

In the foregoing embodiment, in order to detect and output a new input position that overlaps with an already-output input position in either one of the X and Y directions, the new input position (input operation) is determined to be detected on the condition that the same detection result is obtained in at least two consecutive scan cycles. However, an input position detected in a single scan cycle may be output as a new input position unless an input position that overlaps in one direction is detected.

The foregoing embodiment has dealt with the case of detecting input operations on two different input positions simultaneously. Nevertheless, the present invention is also applicable with input operations on three or more different input positions, in which case the input position of the last detected input operation shall be output.

While no input position is output with a flag stored, the input position that is output in the previous scan may be output again.

The present invention is applicable to a touch panel that detects an input operation on its input operation region and outputs the input position in terms of two-dimensional coordinates.

What is claimed is:

1. A method of outputting an input position of a touch panel, comprising:
    scanning a plurality of X input detection elements arranged in an X direction and a plurality of Y input detection elements arranged in a Y direction of the touch panel in a first scan cycle, thereby detecting a first X side input region EX1 from a position or positions of one or a plurality of adjoining X input detection elements that detect(s) an input in the Y direction and detecting a first Y side input region EY1 from a position or positions of one or a plurality of adjoining Y input detection elements that detect(s) an input in the X direction;

outputting a position x1 in the first X side input region EX1 and a position y1 in the first Y side input region EY1 as a first input position;

scanning the plurality of X input detection elements and the plurality of Y input detection elements in a second scan cycle subsequent to the first scan cycle, thereby detecting, in addition to the first X side input region EX1, a second X side input region EX2 from a position or positions of one or a plurality of adjoining X input detection elements that detect(s) an input in the Y direction and detecting, in addition to the first Y side input region EY1, a second Y side input region EY2 from a position or positions of one or a plurality of adjoining Y input detection elements that detect(s) an input in the X direction, at least one of the second X and Y side input regions EX2 and EY2 being a different input region than the first X and Y side input regions EX1 and EY1; and, without simultaneously outputting the first input position, outputting a position x2 in the second X side input region EX2 and a position y2 in the second Y side input region EY2 as a second input position.

2. The method of outputting an input position of a touch panel according to claim 1, wherein the second input position is output only after the second X side input region EX2 and the second Y side input region EY2 continue being detected in consecutive scan cycles.

3. The method of outputting an input position of a touch panel according to claim 2, wherein, when one but not both of i) an X side input region EX detected in a given scan cycle is a different input region than an X side input region EX' detected in the scan cycle immediately after the given scan cycle and ii) a Y side input region EY detected in the given scan cycle is a different input region than a Y side input region EY' detected in the scan cycle immediately after the given scan cycle, a one-axis flag is stored in a memory, and the second input position is output on the basis of whether a one-axis flag is stored in the memory.

4. The method of outputting an input position of a touch panel according to claim 2, wherein, when both i) an X side input region EX detected in a given scan cycle is a different input region than an X side input region EX' detected in the scan cycle immediately after the given scan cycle and ii) a Y side input region EY detected in the given scan cycle is a different input region than a Y side input region EY' detected in the scan cycle immediately after the given scan cycle, a two-axis flag is stored in a memory, and the second input position is output on the basis of whether a two-axis flag is stored in the memory.

5. The method of outputting an input position of a touch panel according to claim 2, wherein, when one but not both of i) an X side input region EX detected in a given scan cycle is a different input region than an X side input region EX' detected in the scan cycle immediately after the given scan cycle and ii) a Y side input region EY detected in the given scan cycle is a different input region than a Y side input region EY' detected in the scan cycle immediately after the given scan cycle, a one-axis flag is stored in a memory, when both i) an X side input region EX detected in a given scan cycle is a different input region than an X side input region EX' detected in the scan cycle immediately after the given scan cycle and ii) a Y side input region EY detected in the given scan cycle is a different input region than a Y side input region EY' detected in the scan cycle immediately after the given scan cycle, a two-axis flag is stored in a memory, and the second input position is output on the basis of whether a one-axis flag is stored in the memory and on the basis of whether a two-axis flag is stored in the memory.

6. The method of outputting an input position of a touch panel according to claim 1, wherein, when an X side input region EX and a Y side input region EY detected in a given scan cycle adjoin to or overlap with an X side input region EX' and a Y side input region EY' detected in the scan cycle immediately after the given scan cycle a position x' in the X side input region EX' and a position y' in the Y side input region EY' are output as an input position.

7. The method of outputting an input position of a touch panel according to claim 1, wherein the positions x1 and x2 are at respective centers in the X direction of the X side input regions EX1 and EX2, and the positions y1 and y2 are at respective centers in the Y direction of the Y side input regions EY1 and EY2.

8. The method of outputting an input position of a touch panel according to claim 1, wherein the second input position is output only after either i) the second X side input region EX2 and the second Y side input region EY2 continue being detected in consecutive scan cycles or ii) the second X side input region EX2 and the second Y side input region EY2 are detected in a scan cycle immediately following a scan cycle in which an X side input region EX2" and a Y side input region EY2" are detected, the X side input region EX2" and the Y side input region EY2" adjoining to or overlapping with the second X side input region EX2 and the second Y side input region EY2.

9. The method of outputting an input position of a touch panel according to claim 8, wherein, when one but not both of i) an X side input region EX detected in a given scan cycle is a different input region than an X side input region EX' detected in the scan cycle immediately after the given scan cycle and neither joins nor overlaps with the X side input region EX' and ii) a Y side input region EY detected in the given scan cycle is a different input region than a Y side input region EY' detected in the scan cycle immediately after the given scan cycle and neither joins nor overlaps with the Y side input region EY', a one-axis flag is stored in a memory, and the second input position is output on the basis of whether a one-axis flag is stored in the memory.

10. The method of outputting an input position of a touch panel according to claim 8, wherein, when both i) an X side input region EX detected in a given scan cycle is a different input region than an X side input region EX' detected in the scan cycle immediately after the given scan cycle and neither joins nor overlaps with the X side input region EX' and ii) a Y side input region EY detected in the given scan cycle is a different input region than a Y side input region EY' detected in the scan cycle immediately after the given scan cycle and neither joins nor overlaps with the Y side input region EY', a two-axis flag is stored in a memory, and the second input position is output on the basis of whether a two-axis flag is stored in the memory.

11. The method of outputting an input position of a touch panel according to claim 8, wherein, when one but not both of i) an X side input region EX detected in a given scan cycle is a different input region than an X side input region EX' detected in the scan cycle immediately after the given scan cycle and neither joins nor overlaps with the X side input region EX' and ii) a Y side input region EY detected in the given scan cycle is a different input region than a Y side input region EY' detected in the scan cycle immediately after the given scan cycle and neither joins nor overlaps with the Y side input region EY', a one-axis flag is stored in a memory, when both i) an X side input region EX detected in a given scan cycle is a different input region than an X side input region EX' detected in the scan cycle immediately after the given scan cycle and neither joins nor overlaps with the X side input region EX' and ii) a Y side input region EY detected in the given scan cycle is a different input region than a Y side input region EY' detected in the scan cycle immediately after the given scan cycle and neither joins nor overlaps with the Y side input region EY', a two-axis flag is stored in a memory, and the second input position is output on the basis of whether a one-axis flag is stored in the memory and on the basis of whether a two-axis flag is stored in the memory.

\* \* \* \* \*